US009400486B2

(12) United States Patent
Lee et al.

(10) Patent No.: US 9,400,486 B2
(45) Date of Patent: Jul. 26, 2016

(54) SPATIAL LIGHT MODULATOR, HOLOGRAPHIC THREE-DIMENSIONAL IMAGE DISPLAY INCLUDING THE SAME, AND METHOD FOR MODULATING SPATIAL LIGHT

(71) Applicant: SAMSUNG ELECTRONICS CO., LTD., Suwon-si (KR)

(72) Inventors: Gae-hwang Lee, Seongnam-si (KR); Jae-eun Jung, Seoul (KR); Kyu-young Hwang, Ansan-si (KR); Hoon Song, Yongin-si (KR); Seung-hoon Han, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/022,560

(22) Filed: Sep. 10, 2013

(65) Prior Publication Data

US 2014/0268264 A1 Sep. 18, 2014

(30) Foreign Application Priority Data

Mar. 13, 2013 (KR) .................. 10-2013-0026801

(51) Int. Cl.
*G03H 1/22* (2006.01)
*G02F 1/1335* (2006.01)
*G02F 1/1333* (2006.01)
*G02F 1/01* (2006.01)
*G02F 1/19* (2006.01)
*G03H 1/02* (2006.01)

(52) U.S. Cl.
CPC .............. *G03H 1/2294* (2013.01); *G03H 1/02* (2013.01); *G02F 1/0126* (2013.01); *G02F 1/133362* (2013.01); *G03H 2001/0224* (2013.01); *G03H 2210/30* (2013.01); *G03H 2222/47* (2013.01); *G03H 2225/25* (2013.01); *G03H 2225/32* (2013.01)

(58) Field of Classification Search
CPC ........... G03H 1/2294; G03H 2225/32; G03H 2001/0224; G03H 2210/30; G03H 2222/47; G03H 2225/25; G03H 1/02; G02F 1/0126; G02F 1/133362; G02F 1/1335; G02F 1/19
USPC .......... 359/3, 7, 9, 10, 11, 12, 13, 15, 19, 22, 359/30, 32, 21, 244, 279; 349/24, 33
See application file for complete search history.

(56) References Cited

U.S. PATENT DOCUMENTS 4,615,595 A * 10/1986 Hornbeck ............... 353/122
5,361,131 A * 11/1994 Tekemori et al. ....... 356/499

(Continued)

FOREIGN PATENT DOCUMENTS

JP 5-273503 A 10/1993
JP 2939072 B2 8/1999

(Continued)

*Primary Examiner* — Bumsuk Won
*Assistant Examiner* — Grant Gagnon
(74) *Attorney, Agent, or Firm* — Sughrue Mion, PLLC

(57) ABSTRACT

A spatial light modulator includes a variable refractive index layer that has a refractive index which is variable based on one of an optical signal and an electrical signal, a metal layer that is disposed on the refractive index-change layer, and a high refractive index layer on the metal layer. Light incident on the metal layer causes generation of a surface plasmon at an interface between the variable refractive index layer and the metal layer.

19 Claims, 4 Drawing Sheets

(56) References Cited

U.S. PATENT DOCUMENTS

| | | | |
|---|---|---|---|
| 5,798,805 A * | 8/1998 | Ooi et al. | 349/10 |
| 6,040,936 A * | 3/2000 | Kim et al. | 359/245 |
| 6,175,442 B1 * | 1/2001 | Booth et al. | 359/290 |
| 6,278,540 B1 * | 8/2001 | Wang | 359/245 |
| 6,768,585 B2 * | 7/2004 | Agostinelli et al. | 359/466 |
| 7,749,907 B2 * | 7/2010 | Miyairi et al. | 438/690 |
| 7,935,212 B2 * | 5/2011 | Jiang et al. | 156/273.3 |
| 8,111,445 B2 * | 2/2012 | Chui et al. | 359/291 |
| 8,279,379 B2 * | 10/2012 | Masuda et al. | 349/96 |
| 8,314,985 B2 * | 11/2012 | Kuang | 359/263 |
| 8,405,899 B2 * | 3/2013 | Chui | 359/290 |
| 2004/0222945 A1 | 11/2004 | Taira et al. | |
| 2005/0002101 A1 | 1/2005 | Kim et al. | |
| 2007/0177275 A1 * | 8/2007 | McGuire, Jr. | 359/630 |
| 2009/0219595 A1 * | 9/2009 | Olaya et al. | 359/25 |
| 2010/0060721 A1 | 3/2010 | Chen et al. | |
| 2010/0302616 A1 * | 12/2010 | Bita et al. | 359/291 |

FOREIGN PATENT DOCUMENTS

| | | |
|---|---|---|
| JP | 3433119 B2 | 8/2003 |
| JP | 4087545 B2 | 5/2008 |
| JP | 2011-043681 A | 3/2011 |
| KR | 10-0438220 B1 | 7/2004 |
| KR | 10-0623522 B1 | 9/2006 |
| KR | 10-1071490 B1 | 10/2011 |
| KR | 10-2012-0091414 A | 8/2012 |

* cited by examiner

SPATIAL LIGHT MODULATOR, HOLOGRAPHIC THREE-DIMENSIONAL IMAGE DISPLAY INCLUDING THE SAME, AND METHOD FOR MODULATING SPATIAL LIGHT

RELATED APPLICATIONS

This application claims priority from Korean Patent Application No. 10-2013-0026801, filed on Mar. 13, 2013, in the Korean Intellectual Property Office, the disclosure of which is incorporated herein in its entirety by reference.

BACKGROUND

1. Field

Apparatuses and methods consistent with exemplary embodiments relate to a spatial light modulator that modulates a phase of light by using a surface plasmon, a holographic three-dimensional (3D) image display including the spatial light modulator, and a method for modulating spatial light, whereby a phase of light is modulated by using a surface plasmon.

2. Description of the Related Art

As the technologies related to the 3D image display have considerably advanced, many three-dimensional (3D) movies have been recently released. To provide a three-dimensional effect, 3D image displays display 3D images using binocular parallax and respectively provide a left-eye image and a right-eye image having different view points to a viewer's left and right eyes. Such 3D image displays include glasses 3D image displays that require specific glasses and non-glasses 3D image displays that require no glasses.

However, when a 3D image displayed in a binocular parallax manner is viewed, a sense of eye fatigue is large, and 3D image displays that provide only a left-eye image and a right-eye image seen from two different view points cannot accurately reflect a change in the view points caused by the movement of the viewer, and thus have limitations in providing a sense of a natural three-dimensional effect.

To address this problem, holographic 3D image displays have been studied so as to display more natural three-dimensional images. Light may be regarded as having wave-like characteristics such as intensity and phase. Liquid crystal displays (LCDs) use an intensity spatial light modulator that controls the intensity of light. When holographic techniques are used, images are displayed by controlling the phase and intensity of light. Thus, holographic 3D image displays require a device capable of controlling the amplitude (intensity) or phase of light.

When holographic 3D image display methods are used, 3D images are obtained by writing and reproducing interference signals obtained by overlapping light from a subject with coherent reference light. Several holographic techniques, such as a pulse hologram method for capturing a moving picture image, a stereo hologram method that enables display of a wide space scene and a wide viewing angle, an embossed hologram method to mass-produce embossed holograms, a natural color hologram method that displays natural colors, digital holography using a digital photographing device, and electron holography for displaying an electronic hologram, have been developed. For example, in electron holography, an image captured from an original object is scanned according to each pixel and transmitted to an image processor, a hologram is created, data included in the hologram is sampled and transmitted to the image processor, the hologram is restored from the transmitted data, and the original object is displayed on a display device.

However, since the amount of data included in the hologram is too large to be sampled and transmitted to the image processor, a study for displaying a hologram created by using a computer in an electro-optic manner has been carried out. Also, several hologram systems for addressing the limitations of the current hologram devices have been studied. For example, a technique has been developed to display a hologram by using an eye-tracking method so as to reduce the amount of calculated data of the hologram and a study has been carried out to use a hologram optical device including a spatial light modulator and an improved hologram writing method in electron holography.

SUMMARY

One or more exemplary embodiments provide a spatial light modulator that modulates a phase of light by using a surface plasmon.

One or more exemplary embodiments provide a holographic three-dimensional (3D) image display including the spatial light modulator that modulates a phase of light by using a surface plasmon.

One or more exemplary embodiments provide a method for modulating spatial light, whereby a phase of light is modulated by using a surface plasmon.

Additional aspects will be set forth in part in the description which follows and, in part, will be apparent from the description, or may be learned by practice of the presented embodiments.

According to an aspect of an exemplary embodiment, a spatial light modulator is provided that modulates a phase of light incident on a plurality of pixels. The spatial light modulator includes: a variable refractive index layer having a refractive index that is variable based on one of an optical signal and an electrical signal; a metal layer that is disposed on the refractive index-change layer, where light incident on the metal layer causes the generation of a surface plasmon at the interface between the variable refractive index layer and the metal layer; and a high refractive index layer that is disposed on the metal layer and has a refractive index higher than a maximum refractive index of the variable refractive index layer, wherein a moving distance of the surface plasmon is smaller than a pitch of the plurality of pixels.

The variable refractive index layer may include a liquid crystal layer.

The metal layer may include at least one selected from the group including Ti, Au, Ag, Pt Cu, Al, Ni, and Cr.

The metal layer may have a thickness in a range of about 10 to about 20 nm.

The moving distance of the surface plasmon may be smaller than 1 μm.

The high refractive index layer may have a refractive index higher than 1.6.

The spatial light modulator may further include a plurality of reflectors that reflect light, are disposed under the metal layer, and protrude downwardly from a bottom surface of the metal layer.

The plurality of reflectors may be disposed between the pixels.

The reflectors may be formed of metal.

The reflectors and the metal layer may be formed of the same material.

Each of the reflectors may have a width smaller than about 10 nm.

Each reflector may have a larger thickness than a thickness of an area of the variable refractive index layer where the surface plasmon passes through.

Each reflector may have a thickness in a range of 150 nm or more to a smaller thickness than that of the variable refractive index layer.

Each reflector may have one shape selected from the group consisting of a cross shape, a conic shape, a spherical shape, a hemispherical shape, an oval shape, and a cylindrical shape.

The spatial light modulator may further include an orientation layer and an electrode layer that are sequentially disposed under the variable refractive index layer.

According to an aspect of another exemplary embodiment, a holographic image display includes: a writing optical system having a first light source that radiates writing light; a reproduction optical system having a second light source that radiates reproduction light; and an image display unit that is disposed between the writing optical system and the reproduction optical system and includes a spatial light modulator that modulates a phase of light incident on a plurality of pixels and a light addressing unit that addresses light from the writing optical system to each pixel of the optical light modulator, wherein the spatial light modulator includes a variable refractive index layer having a refractive index that is variable based on one of an optical signal and an electrical signal, a metal layer that is disposed on the variable refractive index layer, where light incident on the metal layer causes the generation of a surface plasmon at an interface between the variable refractive index layer and the metal layer, and a high refractive index layer that is disposed on the metal layer and has a refractive index higher than a maximum refractive index of the variable refractive index layer, wherein a moving distance of the surface plasmon is smaller than a pitch of the plurality of pixels.

According to an aspect of another exemplary embodiment, a method for modulating spatial light, whereby a phase of light incident on a plurality of pixels is modulated, is provided. The method includes: changing a refractive angle of light by radiating writing light on a variable refractive index layer; generating a surface plasmon by allowing reproduction light to be incident on a metal layer disposed on the refractive index-change layer; and changing a phase of light reflected from the variable refractive index layer via the surface plasmon.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Figure 1:
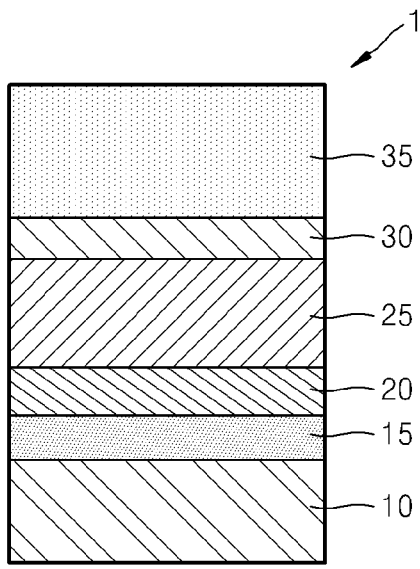
FIG. 1 is a schematic view of a spatial light modulator according to an exemplary embodiment.

Reference will now be made in detail to exemplary embodiments which are illustrated in the accompanying drawings, wherein like reference numerals refer to the like elements throughout. In this regard, the presented embodiments may have different forms and should not be construed as being limited to the descriptions set forth herein. Accordingly, the exemplary embodiments are merely described below, by referring to the figures, to explain aspects of the present description. In the drawings, the sizes of elements are exaggerated for clarity and conveniences. Expressions such as "at least one of," when preceding a list of elements, modify the entire list of elements and do not modify the individual elements of the list.

FIG. 1 is a schematic view of a spatial light modulator 1 according to an exemplary embodiment.

Referring to FIG. 1, the spatial light modulator 1 may include a variable refractive index layer 25 that has a variable refractive index and a metal layer 30 placed on the variable refractive index layer 25. The refractive index of the variable refractive index layer 25 may vary in response to an electrical signal or an optical signal applied thereto. A substrate 10 may be disposed at a lower part of the variable refractive index layer 25. An electrode layer 15 and an orientation layer 20 may be further disposed between the substrate 10 and the variable refractive index layer 25. A high refractive index layer 35 having a higher refractive index than a maximum refractive index of the variable refractive index layer 25 may be disposed on the metal layer 30.

The substrate 10 may be a glass substrate, for example. The variable refractive index layer 25 may be formed of at least one material selected from the group including a liquid crystal, ZnO doped with Er that is known as a photorefractive material, Fe:LiNbO$_3$, BSO, BGO, BTO, PZT, and photoreactive polymer.

The high refractive index layer 35 may have a refractive index higher than 1.6, for example. Alternatively, the high refractive index layer 35 may be formed of a material having a refractive index higher than that of general glass. Generation of a surface plasmon that will be described below and a moving distance of the surface plasmon may be affected by a refractive index difference between the high refractive index layer 35 and the variable refractive index layer 25.

The surface plasmon may be generated at an interface between the variable refractive index layer 25 and the metal layer 30. The metal layer 30 may be formed of at least one metal selected from the group consisting of Ti, Au, Ag, Pt Cu, Al, Ni, and Cr, for example. Of course, the metal layer 30 may be formed of an alloy consisting of at least two metals selected from the group consisting of Ti, Au, Ag, Pt Cu, Al, Ni, and Cr. However, exemplary embodiments are not limited thereto. For example, when visible light is to be modulated by the spatial light modulator 1, a metal layer or an alloy layer may be used, and when infrared rays are modulated by the spatial light modulator 1, an oxide such as IZO (Indium Tin Oxide) may be used. When infrared rays are to be modulated and are radiated onto a layer formed of an oxide, the oxide has metal characteristics at an infrared wavelength, and thus, the layer formed of the oxide may also be included in the metal layer.

A general spatial light modulator may control at least one of the intensity and phase of light at different positions by using an electrical signal or an optical signal. The spatial light modulator 1 according to the current exemplary embodiment modulates only the phase of light using the surface plasmon. A phase spatial light modulator having a high spatial resolution may be used in the field of optics in various ways and may be applied to a holographic image display, for example. The spatial light modulator changes the phase of light by a change of refractive indices that occurs when light passes through a variable refractive index layer. In order to change the phase of light, the variable refractive index layer should have a thickness equal to or higher than a predetermined thickness. Due to this thickness, the spatial resolution of an image display may be decreased. For example, in general, a spatial resolution of about 1 um may be necessary to obtain a viewing angle required for the image display. However, a spatial light modulator employing a general phase modulation method has a low spatial resolution. When the spatial resolution is low, the diffraction efficiency may be deteriorated when spatial light modulation is performed by using the phase modulation method.

In the current exemplary embodiment, in order to address this problem regarding the low spatial resolution, the phase of incident light is changed via the surface plasmon so that deterioration of the diffraction efficiency due to the low spatial resolution may be reduced. That is, the moving distance of the surface plasmon is reduced so as to improve the spatial resolving power.

The surface plasmon occurs due to an interaction between light incident on the metal layer 30 and electrons that exist in the metal layer 30. When the movement of light coincides with the movement of the electrons in the metal layer 30, electromagnetic energy of incident light may be changed into kinetic energy of electrons. An electromagnetic field that is generated due to the movement of the electrons is referred to as a plasmon, and incident light is changed into a surface plasmon on the metal layer 30, moves thereon, and is reflected therefrom. When the surface plasmon moves along the metal layer 30, phase information varies according to the refractive index of the variable refractive index layer 25, and thus, the phase of reflected light is changed. In this case, a region adjacent to the metal layer 30 is affected by the surface plasmon, and a region at a distance of several nanometers may be affected by the surface plasmon depending on a condition. The surface plasmon may be affected by a refractive index difference between the high refractive index layer 35 and the variable refractive index layer 25, refractive indices of the metal layer 30 and the variable refractive index layer 25 that is adjacent to the metal layer 30, the wavelength of incident light, an incidence angle of light on the metal layer 30, a material of the metal layer 30, and the thickness of the metal layer 30. Thus, the moving distance of the surface plasmon may be adjusted by adjusting these factors.

The following Equation shows a condition for occurrence of surface plasmon resonance.

$$\theta_{SPR} = \sin^{-1}\left[\varepsilon_1^{-1/2} Re\left(\frac{\varepsilon_2 \varepsilon_3}{\varepsilon_2 + \varepsilon_3}\right)^{1/2}\right]$$ ⟨Equation 1⟩

Here $\theta_{SPR}$ is an incident angle of light at which surface plasmon resonance occurs, $\in_1$ is a dielectric constant of a layer adjacent to the metal layer 30 at a side on which light is incident, and $\in_2$ is a dielectric constant of a layer adjacent to the metal layer 30 at an opposite side to the side on which light is incident. Regarding the spatial light modulator 1 illustrated in FIG. 1, $\in_1$ is a dielectric constant of the high refractive index layer 35 and $\in_2$ is a dielectric constant of the variable refractive index layer 25. The dielectric constant of the metal layer 30 and the dielectric constant of the variable refractive index layer 25 may be adjusted based on Equation 1 so that surface plasmon resonance does not occur in the metal layer 30. If surface plasmon resonance occurs, the moving distance of the surface plasmon is relatively increased compared to a case where surface plasmon resonance does not occur. The spatial resolution of the spatial light modulator 1 according to the current exemplary embodiment may be determined by a distance by which the surface plasmon moves along the metal layer 30. Thus, when surface plasmon resonance occurs, the spatial resolution of the spatial light modulator 1 may be reduced. Thus, in the current embodiment, the dielectric constant of the metal layer 30 and the dielectric constant of the variable refractive index layer 25 may be adjusted so that surface plasmon resonance may not occur, or the incident angle of light may be adjusted so that the moving distance of the surface plasmon may be decreased. Even when surface plasmon resonance occurs, the moving distance of the surface plasmon may be adjusted according to the intensity of resonance. Thus, in the current embodiment, the occurrence of surface plasmon resonance may be prevented or the intensity of surface plasmon resonance may be reduced so as to decrease the moving distance of the surface plasmon.

If the moving distance of the surface plasmon is too small, since less light phase modulation may occur, the moving distance of the surface plasmon at which a predetermined phase modulation range may be obtained is necessary. A desired surface plasmon moving distance may be obtained by adjusting several factors that affect the moving distance of the surface plasmon, as described above. In case of the spatial light modulator 1 of FIG. 1, the moving distance of the surface plasmon may be about 1 µm, for example, and the spatial resolution of the spatial light modulator 1 may be about four times the moving distance of the surface plasmon. That is, the spatial resolution may be about 4 µm. Thus, when the spatial light modulator 1 has this spatial resolution, if a pixel size (a pitch) is less than 4 µm, diffraction efficiency (or optical efficiency) may be deteriorated.

Figure 2:
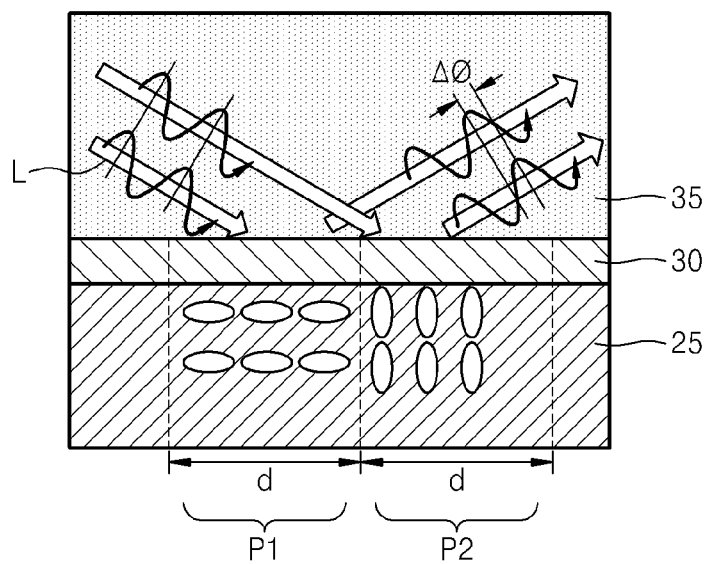
FIG. 2 is a partial enlarged view of the spatial light modulator illustrated in FIG. 1.

FIG. 2 is a partial enlarged view of the spatial light modulator 1 of FIG. 1. A phase modulation operation will be described with reference to FIG. 2.

The spatial light modulator 1 may include a plurality of pixels P1 and P2 and may modulate the phase of light according to each of the plurality of pixels P1 and P2. If light L is incident on the spatial light modulator 1, the light L is incident on the metal layer 30 via the high refractive index layer 35, and a surface plasmon is generated at an interface between the metal layer 30 and the variable refractive index layer 35. The pixels P1 and P2 may have a larger pitch d than the moving distance of the surface plasmon. For example, when the moving distance of the surface plasmon is t, the pixels P1 and P2 may be configured to satisfy d>t.

The surface plasmon moves along the interface between the metal layer 30 and the variable refractive index layer 25 and is reflected therefrom. In this case, the phase of the surface plasmon may be differently modulated depending on a refractive index of the variable refractive index layer 25 according to each pixel P1 or P2. For example, in FIG. 2, the refractive index of the variable refractive index layer 25 at a first pixel P1 and the refractive index of the variable refractive index layer 25 at a second pixel P2 may be different from each other, and the phase of light that is reflected from each pixel P1 or P2 may be differently modulated according to the refractive indexes. A phase difference Δϕ between light reflected from the first pixel P1 and light reflected from the second pixel P2 may occur.

The refractive index of the variable refractive index layer 25 at each pixel P1 or P2 may be adjusted by a writing light that will be described below. The phase of light may be controlled using the surface plasmon, and a holographic three-dimensional (3D) image may be displayed using the spatial light modulator 1 of FIG. 1.

Figure 3:
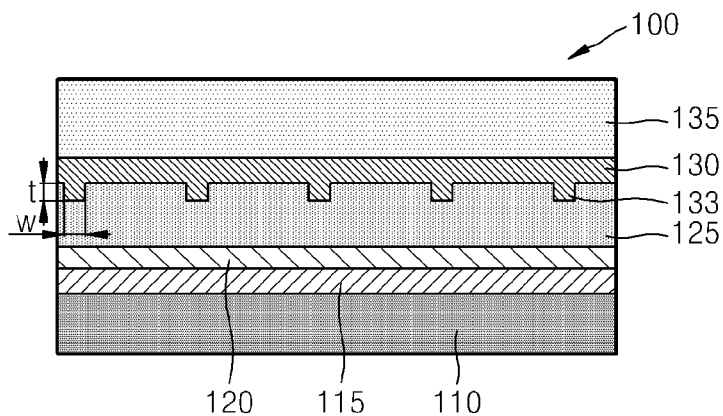
FIG. 3 is a cross-sectional view of a spatial light modulator according to another exemplary embodiment.

FIG. 3 is a schematic view of a spatial light modulator 100 according to another exemplary embodiment. The spatial light modulator 100 may include a variable refractive index layer 125, which changes an angle of refraction of light, and a metal layer 130 disposed on the variable refractive index layer 125. A substrate 110 may be disposed below the variable refractive index layer 125. An electrode layer 115 and an orientation layer 120 may be further disposed between the substrate 110 and the variable refractive index layer 125. A high refractive index layer 135 having a refractive index higher than that of the variable refractive index layer 125 may be disposed on the metal layer 130.

The substrate 110 may be a glass substrate, for example. The variable refractive index layer 125 may be a liquid crystal layer, for example.

A surface plasmon may be generated at an interface between the variable refractive index layer 125 and the metal layer 130. The metal layer 130 may be formed of at least one metal selected from the group consisting of Ti, Au, Ag, Pt Cu, Al, Ni, and Cr, for example. Of course, the metal layer 130 may be formed of an alloy consisting of at least two metals selected from the group consisting of Ti, Au, Ag, Pt Cu, Al, Ni, and Cr. However, exemplary embodiments are not limited thereto.

A plurality of reflectors 133 may be disposed under the metal layer 130 and may be spaced apart from each other. The plurality of reflectors 133 may be arranged at regular intervals. The reflectors 133 protrude downwardly from a bottom surface of the metal layer 130 and extend to an inside of the variable refractive index layer 125. Each of the reflectors 133 has a smaller thickness than that of the variable refractive index layer 125.

The reflectors 133 may be formed of a material that reflects the surface plasmon. For example, the reflectors 133 may be formed of metal. The reflectors 133 may be formed of the same material as that of the metal layer 130. Alternatively, the reflectors 133 may be formed of a material that is different from that of the metal layer 130. The reflectors 133 may be disposed between pixels and may prevent a surface plasmon formed in one pixel from moving to another pixel. The moving distance of the surface plasmon is reduced by the reflectors 133 when phase modulation is performed using the surface plasmon so that the spatial resolution of the spatial light modulator 100 may be improved. The reflectors 133 may have a nanostructure. Here, the nanostructure may represent a nanosized structure. The electrode layer 115 may be formed of a light-transmitting material. For example, the electrode layer 115 may be an indium tin oxide (ITO) electrode. In this way, the reflectors 133 may be disposed between pixels so that the spatial resolution of the spatial light modulator 100 may be improved because the surface plasmon generated by incident light is reflected by the reflectors 133 and does not move to an adjacent pixel.

The surface plasmon may be controlled by a refractive index difference between the high refractive index layer 135 and the variable refractive index layer 125, refractive indices of the metal layer 130 and the variable refractive index layer 125 that is adjacent to the metal layer 130, the wavelength of incident light, an incident angle of light on the metal layer 130, a material of the metal layer 130, and the thickness of the metal layer 130.

If light is incident on the metal layer 130, the surface plasmon may be generated on the metal layer 130 due to incident light according to refractive indices of the metal layer 130 and the variable refractive index layer 125 that is adjacent to the metal layer 130. Thus, the phase of light may be changed when light is reflected, and a phase change may be controlled by the refractive index of the variable refractive index layer 125 adjacent to the metal layer 130. The spatial resolution of the spatial light modulator 100 may be determined by a distance by which the surface plasmon moves along the surface of the metal layer 130. If the reflectors 130 are disposed between pixels so as to reduce the moving distance of the surface plasmon, interference of the surface plasmon between the pixels is reduced so that the spatial resolution and diffraction efficiency of the spatial light modulator 100 may be improved.

The reflectors 133 may have a minimum width w that is required to reflect the surface plasmon. For example, each reflector 133 may have a width of less than 10 nm. A thickness t of each reflector 133 may be greater than a thickness of an area where the surface plasmon passes through the variable refractive index layer 125. For example, each reflector 133 may have a thickness in a range of 150 nm or more to a smaller thickness than that of the variable refractive index layer 125. The metal layer 130 may have a thickness smaller than 20 nm, for example. The spatial light modulator 100 may be manufactured as follows. A metal layer 130 is formed by depositing, for example, Ag on a substrate (corresponding to a high refractive index layer) 135 formed of a material having a relatively high refractive index. Reflectors 133 may be formed on the metal layer 130 by performing a photolithography process or a focusing ion beam process. Then, an electrode layer 115 is deposited on a substrate 110, and an orientation layer 120 is formed on the electrode layer 115. The substrate (high refractive index layer) on which the metal layer 130 is deposited, and the substrate 110 on which the electrode layer 115 is deposited, are disposed to face each other, and a variable refractive index material, such as a liquid crystal, is injected between the substrate and the substrate 110, thereby forming a variable refractive index layer 125. As such, the spatial light modulator 100 of FIG. 3 may be manufactured.

The spatial light modulator 100 according to the current embodiment may perform light phase control with high efficiency, and thus, may be used in a holographic image display that requires high performance and may be useful in the field of other optical applications.

Figure 4:
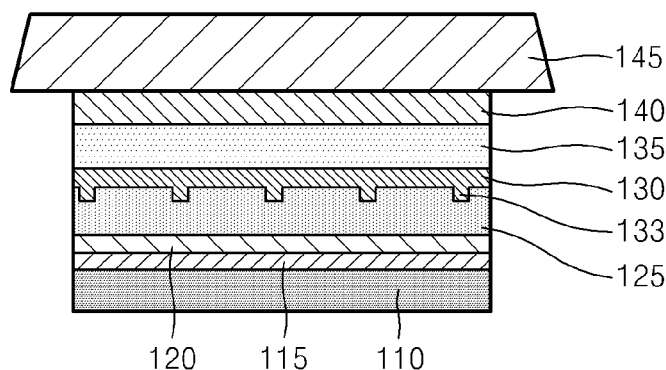
FIG. 4 illustrates an example in which a prism is added to the spatial light modulator illustrated in FIG. 3.
Figure 5:
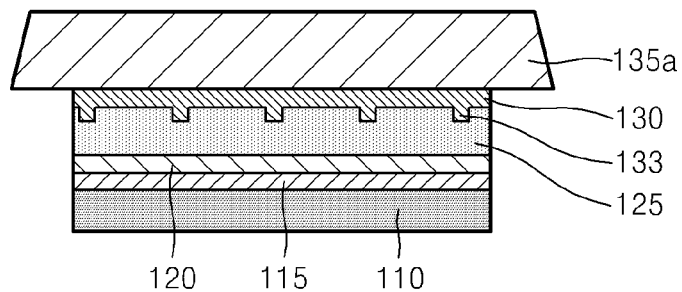
FIG. 5 illustrates an example in which the spatial light modulator of FIG. 3 is modified.

FIG. 4 illustrates an example in which a prism 145 is further disposed on the high refractive index layer 135 of the spatial light modulator 100 of FIG. 3. A refractive index matching material layer 140 may be further disposed between the high refractive index layer 135 and the prism 145. FIG. 5 illustrates an example in which the high refractive index layer 135 of the spatial light modulator 100 of FIG. 3 is replaced with a high refractive index layer 135a having a prism shape. The prism-shaped high refractive index layer 135a adjusts the incident angle of light so that a surface plasmon may be smoothly generated.

Figure 6:
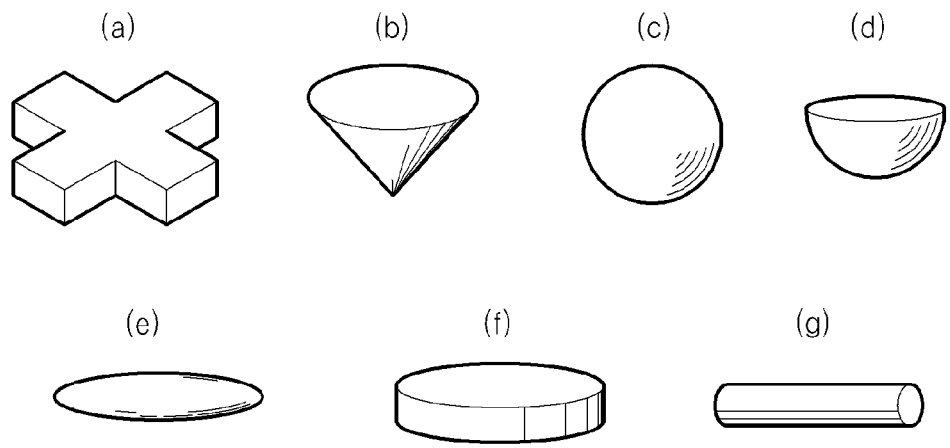
FIG. 6 illustrates examples of reflectors that are included in the spatial light modulator of FIG. 3.

In FIG. 6, (a) through (g) illustrate examples of the reflectors 133 formed on the metal layer 130. The reflectors 133 may have one shape selected from the group consisting of a cross shape, a conic shape, a spherical shape, a hemispherical shape, an oval shape, and a cylindrical shape, for example.

Figure 7:
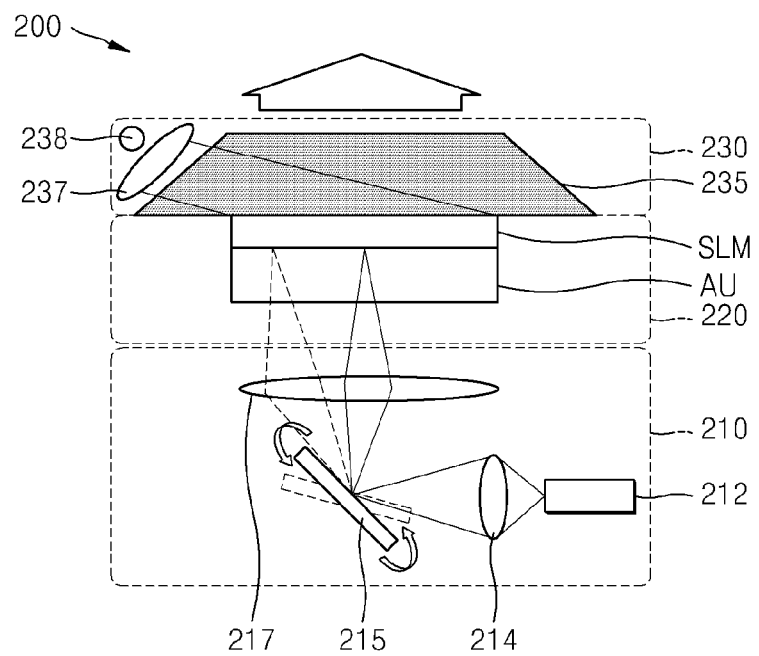
FIG. 7 is a schematic view of a holographic three-dimensional (3D) image display including a spatial light modulator, according to an exemplary embodiment.

FIG. 7 is a schematic view of a holographic image display 200 including a spatial light modulator, according to an exemplary embodiment.

The holographic image display 200 may include a writing optical system 210, a reproduction optical system 230, and an image display unit 220 disposed between the writing optical system 210 and the reproduction optical system 230. The image display unit 220 may include a spatial light modulator (SLM) and a light addressing unit (AU). The light addressing unit AU may address light from the writing optical system 210 to each pixel of the SLM. The writing optical system 210 may include a first light source 212 that radiates a writing light, for example, and a scanning unit 215 for scanning the writing light. Aspects of this exemplary embodiment are not limited thereto, and the writing optical system 210 may be modified in various ways depending on an addressing type. The first light source 212 may be a laser source, for example. The scanning unit 215 may include a rotatable mirror, for example. A first optical element 214 for focusing light may be disposed between the first light source 212 and the scanning unit 215. For example, the first optical element 214 may be a lens. A second optical element 217 for focusing light may be disposed between the scanning unit 215 and the light addressing unit (AU). For example, the second optical element 217 may be a lens.

The reproduction optical system 230 may include a second light source 238 for radiating a reproduction light and a third optical element 235 that guides the reproduction light to the SLM. The third optical element 235 may be a prism, for example. A fourth optical element, for example, a lens 237 may be further disposed between the second light source 238 and the third optical element 235.

Figure 8:
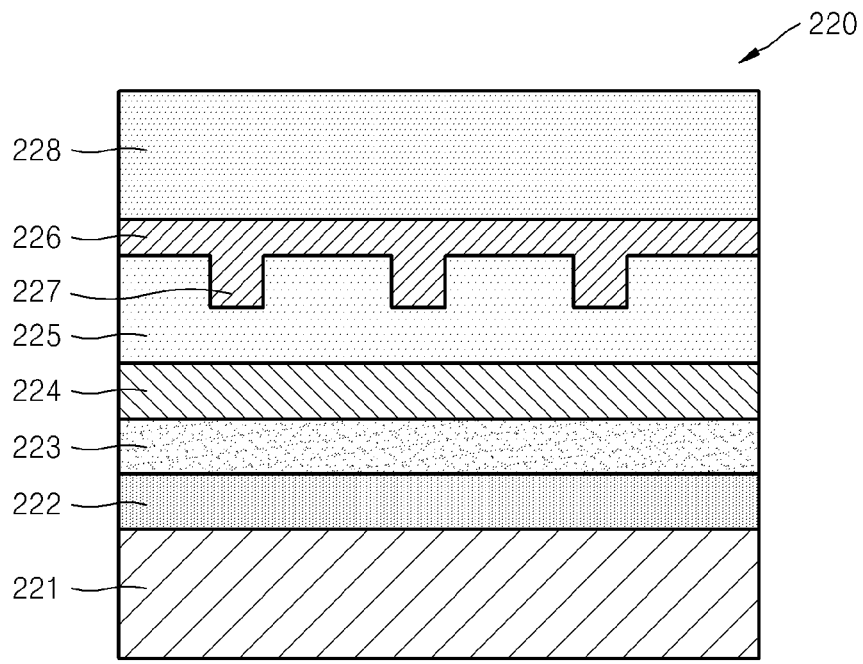
FIG. 8 illustrates an example of an addressing system that is used in the holographic 3D image display illustrated in FIG. 7.

FIG. 8 illustrates an example of an optical addressing type image display unit 220. The SLM of the image display unit 220 may include, for example, a substrate 221, an electrode layer 222, an orientation layer 224, a variable refractive index layer 225, a metal layer 226, and a high refractive index layer 228. A photo conductor layer 223 for optical addressing may be disposed between the electrode layer 222 and the orientation layer 224. A plurality of reflectors 227 may be disposed under the metal layer 226 and may be spaced apart from each other. The plurality of reflectors 227 may be arranged at regular intervals. The photo conductor layer 223 may be used as the light AU. The photo conductor layer 223 may be formed of a-Si, for example.

An operation of the holographic image display 200 will be described below. A writing light is radiated from the first light source 212, is scanned by the scanning unit 215, and is sequentially incident on each pixel of the image display unit 220. The refractive index of the variable refractive index layer 225 of the SLM is changed due to radiation of the writing light. The reproduction light from the second light source 238 is incident on the variable refractive index layer 225 of the SLM having a changed refractive index, and a surface plasmon is generated in the metal layer 226 of each pixel. The phase of the reproduction light may be modulated by the variable refractive index layer 225 via the surface plasmon and the reproduction light may be reflected. Due to light having a modulated phase in this way, a holographic 3D image may be displayed to a viewer.

Figure 9:
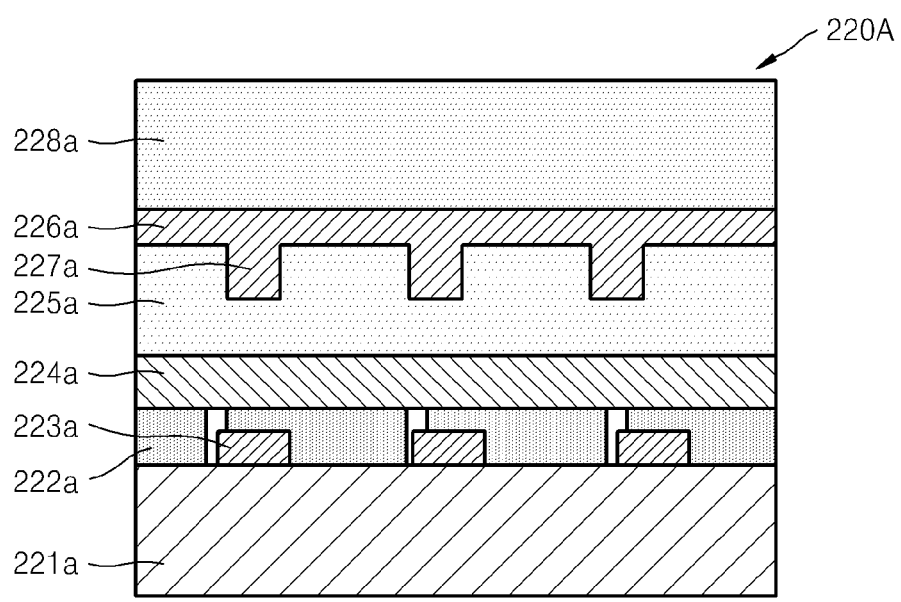
FIG. 9 illustrates another example of an addressing system that is used in the holographic 3D image display of FIG. 7.

FIG. 9 illustrates an example of an electrical addressing type image display unit 220A. The SLM of the image display unit 220A may include a substrate 221a, an electrode layer 222a, an orientation layer 224a, a variable refractive index layer 225a, a metal layer 226a, and a high refractive index layer 228a. A plurality of reflectors 227a may be disposed under the metal layer 226a and may be spaced apart from each other. The plurality of reflectors 227a may be arranged at regular intervals. For example, a thin film transistor (TFT) 223a may be disposed on the electrode layer 222a so as to electrically address light. Turn on-turn off of light may be controlled in each pixel of the image display unit 220A via the TFT 223a. The writing optical system of the holographic image display employing the electrical addressing type image display unit 220A does not require the scanning unit 215 illustrated in FIG. 7.

It should be understood that the exemplary embodiments described herein should be considered in a descriptive sense only and not for purposes of limitation. Descriptions of features or aspects within each embodiment should typically be considered as being available for other similar features or aspects in other embodiments.

What is claimed is:

1. A spatial light modulator comprising a plurality of pixels, the spatial light modulator further comprising:
    a variable refractive index layer having a refractive index which is variable in each of the plurality of pixels based on one of an optical signal and an electrical signal;
    a metal layer that is disposed on an upper surface of the variable refractive index layer, wherein light incident on the metal layer causes the generation of a surface plasmon at an interface between the variable refractive index layer and the metal layer; and
    a high refractive index layer that is disposed on the metal layer, wherein a refractive index of the high refractive index layer is higher than a maximum refractive index of the variable refractive index layer,
    wherein the surface plasmon moves along the interface between the variable refractive index layer and the metal layer and is reflected from the variable refractive index layer to modulate a phase of light incident on the variable refractive index layer, and a moving distance of the surface plasmon, in a horizontal direction along the interface between the variable refractive index layer and the metal layer, is smaller than a pitch of two adjacent pixels of the spatial light modulator, thereby increasing a spatial resolution of the spatial light modulator.

2. The spatial light modulator of claim 1, wherein the variable refractive index layer comprises a liquid crystal layer.

3. The spatial light modulator of claim 1, wherein the metal layer comprises at least one selected from a group consisting of Ti, Au, Ag, Pt Cu, Al, Ni, and Cr.

4. The spatial light modulator of claim 1, wherein the metal layer has a thickness in a range of about 10 nm to about 20 nm.

5. The spatial light modulator of claim 1, wherein the moving distance of the surface plasmon is smaller than 1 μm.

6. The spatial light modulator of claim 1, wherein the high refractive index layer has a refractive index higher than 1.6.

7. The spatial light modulator of claim 1, further comprising an orientation layer and an electrode layer that are sequentially disposed under the variable refractive index layer.

8. The spatial light modulator of claim 1, wherein the metal layer contacts the variable refractive index layer and there is no intervening layer between the metal layer and the variable refractive index layer.

9. The spatial light modulator of claim 1, further comprising a plurality of reflectors that are disposed under the metal layer and protrude downwardly from a bottom surface of the metal layer toward the variable refractive index layer.

10. The spatial light modulator of claim 9, wherein the plurality of reflectors are disposed between the plurality of pixels.

11. The spatial light modulator of claim 9, wherein a shape of each reflector is one of a group consisting of a cross shape, a conic shape, a spherical shape, a hemispherical shape, an oval shape, and a cylindrical shape.

12. The spatial light modulator of claim 9, wherein the reflectors are formed of metal.

13. The spatial light modulator of claim 12, wherein the reflectors and the metal layer are formed of the same material.

14. The spatial light modulator of claim 12, wherein each of the reflectors has a width smaller than 10 nm.

15. A holographic image display comprising:
a writing optical system comprising a first light source that radiates writing light;
a reproduction optical system comprising a second light source that radiates reproduction light; and
an image display unit disposed between the writing optical system and the reproduction optical system, wherein the image display unit comprises a spatial light modulator that comprises a plurality of pixels and a light addressing unit that addresses light from the writing optical system to each pixel of the optical light modulator, wherein the spatial light modulator comprises:
a variable refractive index layer having a refractive index which is variable in each of the plurality of pixels based on one of an optical signal and an electrical signal,
a metal layer that is disposed on an upper surface of the variable refractive index layer, wherein light incident on the metal layer causes the generation of a surface plasmon at an interface between the variable refractive index layer and the metal layer, and
a high refractive index layer that is disposed on the metal layer, wherein a refractive index of the high refractive index layer is higher than a maximum refractive index of the variable refractive index layer,
wherein the surface plasmon moves along the interface between the variable refractive index layer and the metal layer and is reflected from the variable refractive index layer to modulate a phase of light incident on the variable refractive index layer, and a moving distance of the surface plasmon, in a horizontal direction along the interface between the variable refractive index layer and the metal layer, is smaller than a pitch of two adjacent pixels, thereby increasing a spatial resolution of the spatial light modulator.

16. The holographic image display of claim 15, wherein a moving distance of the surface plasmon is smaller than 1 μm.

17. The holographic image display of claim 15, wherein the high refractive index layer has a refractive index of more than 1.6.

18. The holographic image display of claim 15, further comprising a plurality of reflectors that are disposed under the metal layer, and protrude downwardly from a bottom surface of the metal layer toward the variable refractive index layer.

19. A method for modulating light, whereby a phase of light incident on a plurality of pixels of a spatial light modulator is modulated, the method comprising:
changing a refractive index of a variable refractive index layer in each of the plurality of pixels based on one of an optical signal and an electrical signal;
generating a surface plasmon by radiating reproduction light onto a metal layer disposed on the variable refractive index layer; and
changing a phase of light reflected from the variable refractive index layer via the surface plasmon along an interface between the variable refractive index layer and the metal layer and is reflected from the variable refractive index layer, wherein a moving distance of the surface plasmon, in a horizontal direction along the interface between the variable refractive index layer and the metal layer, is smaller than a pitch of two adjacent pixels of the spatial light modulator, thereby increasing the spatial resolution of the spatial light modulator.

\* \* \* \* \*